Figure 1:
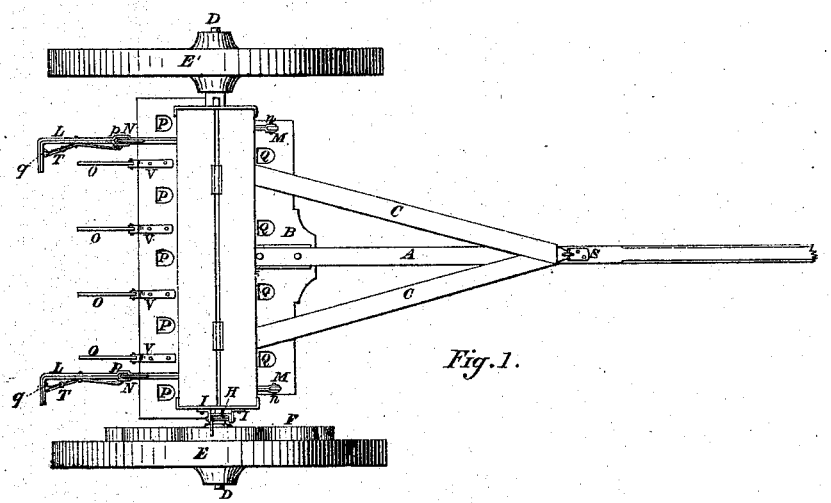

[84.]

JOHN P. FLOOM.

119,022.

Seed Drill.

2 Sheets--Sheet 1.

Patented Sep. 19, 1871.

Witnesses.

John P. Floom, Inventor
by Job Abbott, Attorney

[84.]

JOHN P. FLOOM.

119,022.

Seed Drill.

Patented Sep. 19, 1871.

2 Sheets--Sheet 2.

2 Sheets
Sheet 2.
(Amended.)

Amended Drawing.

R. McKinley
Andrew Choffin } Witnesses.

John P. Floom, Inventor.
by Job Abbott, Attorney.

UNITED STATES PATENT OFFICE.

JOHN P. FLOOM, OF CANTON, OHIO.

IMPROVEMENT IN GRAIN-DRILLS.

Specification forming part of Letters Patent No. 119,022, dated September 19, 1871.

*To all whom it may concern:*

Be it known that I, JOHN P. FLOOM, of Canton, Stark county, Ohio, have invented certain Improvements in Seed Drills; and that the following is a full, clear, and exact specification thereof, which will enable others skilled in the art to make and use the said invention.

In the ordinary construction of seed-drills the seeding-teeth are arranged in two rows, the back row of which acts as coverers for the front row; and if the drill is designed to complete the work of covering, a set of covering-teeth is placed back of the back row of seeding-teeth to act as coverers for said back row. These covering-teeth act in a different manner as coverers from the back row of seed-teeth, as these seed-teeth act as coverers simply by throwing up a sufficient furrow to push over the sides of the furrows made by the front teeth, while the covering-teeth skim over the furrow of the front seed-teeth and level off its sides into the furrows of the back seed-teeth; and it has been found in practice that, in order to have the covering-teeth act effectively, they should be of a triangular or half-lozenge form, of considerable width at the back, and the sides made with a medium slope, and that they should run at a shallow depth close up to the back row of seed-teeth. But when supported in this position by an ordinary vertical standard the clods of turf, or stubble and stones, were liable to lodge on the covering-teeth and between the standards of the seeding and covering-teeth, and thus prevent the proper action of the coverers; and this difficulty has made the practical operation of the seed-drill as a seeding and covering device so unsatisfactory that farmers are in the habit of drilling in the grain and then harrowing the ground to cover it completely. The first part of my invention is designed to obviate this difficulty; and to this end, it consists in the construction of a covering-tooth made in the general form of the hand when placed on a table with the fingers close together and the knuckles somewhat elevated, which tooth is secured on a standard running back nearly horizontal for a sufficient distance to allow obstructions to clear themselves by rolling off from it, and then rising almost vertically to the tooth-frame; said tooth being arranged to run at a shallow depth close to the back row of seed-teeth and directly behind the front row, and then serving to cover the furrows of the back teeth, and to level off the ground and leave it in good condition, without danger of catching and dragging obstructions, as before shown. The second part of my invention relates to the manner of suspending the tooth-frame, to which the seeding and covering-teeth are attached, under the axle of the machine; the means employed being a slotted supporting-link, lifting-lever, and locking-link, and the object being to obtain a suspending mechanism which will allow the teeth to sink gradually down to the proper depth, and which can be easily operated to raise or lower the teeth, or to set them to run at any required depth. The third part of my invention relates to the combination of a pivoted latch-plate and pendent shipping-rod with the slide plate of the seed-distributer; the several parts of the machine being so arranged that the rising of the end of the tooth-frame next the driving-wheel raises the shipping-rod and lifts the slide-plate latch from the upturned end of the vibrator, thus unshipping the seed-dropping mechanism and preventing the waste of seed while turning the machine or driving it to and from the field. The fourth part of my invention relates to the combination, with the seed-teeth, of a peculiarly-constructed device for scattering the seed as it passes from the seed-box through the seed-teeth to the ground, for the purpose of scattering the grain to the sides of the furrows made by the teeth, instead of dropping it in the center of the furrow, in order to place the grain in the ground in a manner approaching that of broadcast sowing, which is sometimes found to be preferable to the ordinary manner of drill sowing.

Figure 2:
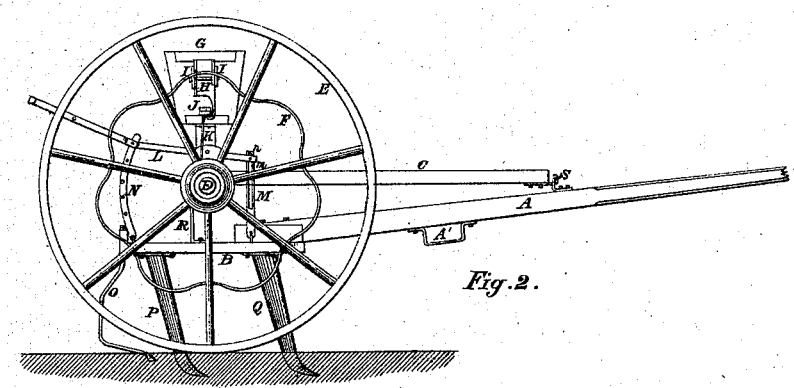
Figure 3:
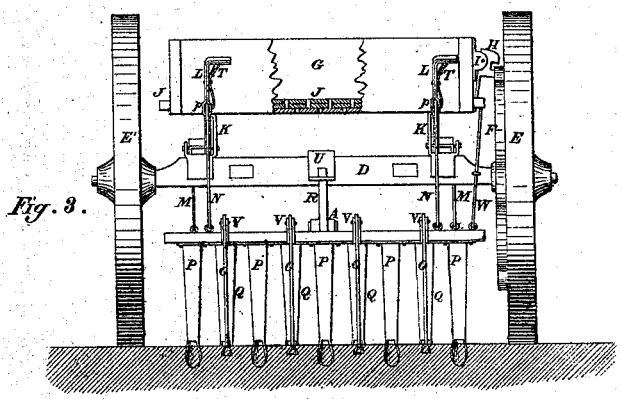
Figure 4:
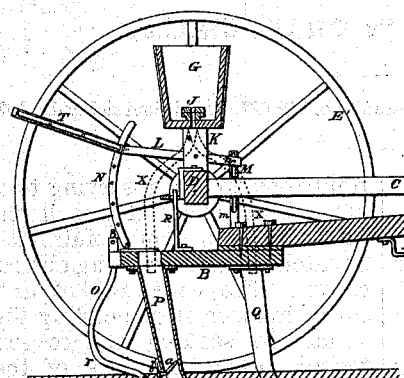
Figure 5:
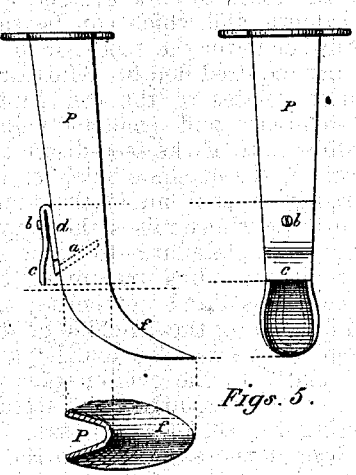
Figure 6:
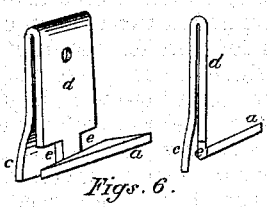
Figure 7:
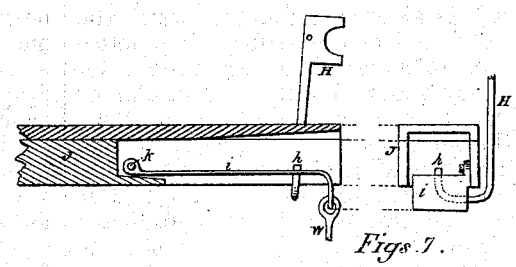
Figure 8:
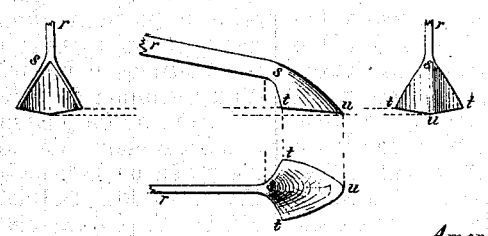

In the accompanying drawing, Figures 1, 2, and 3 are plan, side view, and rear view, respectively, of a machine embodying my improvements. Fig. 4 is a longitudinal section of the said machine. Figs. 5 are side and rear views and sectional plan of seed-tooth. Figs. 6 are perspective and side views of the broadcast device for the seed-teeth. Figs. 7 are sectional side view and end view of the slide-plate attachments. Figs. 8 are front, side, and rear views, and plan of covering-tooth.

D is the machine axle, which is supported on the wheels E E', and into which are mortised the frame pieces C C, which are united by a hookconnection, S, with the draft-tongue A. The standards K K are secured on the axle D, and serve as supports for the seed-box G, and at their lower ends are lugs, which form bearings for bolts on which the lifting-levers L L are pivoted. The front ends n of the levers L are forked, as shown in Fig. 1, and the supporting-links M M are secured in said forks by pins which pass through the slots m in said links. The tooth-frame B is rigidly secured to the draft-tongue A, and is supported at any desired height by the links M M, which are attached to it near the front edge, and by the locking-links N N, which are attached near the rear edge and extend up through eyes p formed in the levers L, where they are secured by pins on the ends of the short levers T, which are attached to the sides of the levers L, and are pressed out at their rear ends by the springs q so as to keep the pins at their front ends pressed into holes in the eyes p and links N, as shown in Fig. 1. By grasping the bent handles at the rear ends of the levers L L and pressing the short levers T T so as to draw the pins at their ends from the links N N the operator can raise the tooth-frame to clear the teeth from obstructions, or to raise them when not at work, and can also set the teeth so as to run at any required depth; and this setting of the teeth may be facilitated by scales marked on the links N N, which should indicate, by the position of the levers L L, the running depth of the teeth due to such position, the links N N and M M being connected to the tooth-frame B by eyebolts with nuts below the frame in this last case, so as to lengthen said links as the teeth wear off in order to preserve the accuracy of the scales marked on the links N.

In commencing work with the machine, or in increasing the running depth of the teeth while at work, it is desirable to have the teeth gradually sink to their proper depth in order to avoid violent strains on the machine; and to effect this result the slots m are formed in the links M so as to allow the pins in the ends of the levers L to move down in said slots when the rear ends of said levers are raised without pressing down on the tooth-frame B.

To prevent the tooth-frame B from swinging sidewise under the axle D, which it might do were it simply held by the long links M N, which have only a narrow bearing in the levers L, the standard R is secured on the tooth-frame B, and works up and down through a slot in the plate U secured on the axle D, as shown in Figs. 3 and 4. The front seed-teeth Q Q are secured to the tooth-frame B near its front edge, and at distances from each other equal to twice the distance between the rows of grain as it is to be drilled, and the rear teeth P P are secured near the rear edge of the tooth-frame in such positions as to run midway between the teeth Q Q, as shown in Figs. 1 and 3. The necks of the teeth P Q are made of a U-section, as shown at P in plan in Fig. 5, and the working part f is made quite broad and flat, as shown in Fig. 5, so as to loosen up a broad furrow for the grain without throwing up high ridges at the sides of the furrow. The covering-teeth O r s have their working part s made in a half-lozenge form, as shown in plan in Fig. 8, the sides s t u sloping off from the front edge s u, and the rear points t t being a little higher than the front point u; and the standard s r runs back from this working part nearly horizontally, as shown in Figs. 2 and 4, and then bends up into the upright portion r o, which is secured in the bracket V on the tooth-frame B by means of an iron pin or bolt, which forms the pivot of the tooth, and a wooden pin, which is run through the bracket and standard, and which prevents the tooth from turning back under ordinary usage, but which will break and allow the tooth to swing back in case the lower portion strikes any immovable obstruction. The covering-teeth O r s are arranged to run directly behind the front seed-teeth Q and close up to the rear seed-teeth P, as shown in Figs. 2 and 3, and they are set to run at about one-half to one-third the depth of the seed-teeth P Q, as shown in Fig. 4.

From this description it will be seen that the rear seed-teeth P act as coverers for the front teeth Q by pushing over the sides of the furrows made by them into the furrows made by the teeth Q, and that the covering-teeth O r s act as coverers and levelers by skimming off the upper portion of earth thrown over the furrows of the teeth Q by the teeth P and pushing it out over the furrows made by the teeth P thus completing the work of covering, and leaving the earth in a smooth and level condition.

By bringing the coverers s close up to the seed-teeth P they are kept nearly under the axle D, so that they are maintained at a uniform depth by the wheels E E', and are not caused to run too deep or too shallow, or not at all, by the up-and-down movements of the front end of the tongue A, or by the rising and falling of the wheels E E' in passing over furrows in the field, as would be the case were these teeth placed considerably back of the teeth P; and it is also seen that the horizontal position of the portion r s of the tooth-standard o r allows any sods or stones to pass over the part s u between the teeth P P, and to drop at one side of the standard r s without impeding the operation of the teeth. In the seed-box G is arranged the slide-plate J, having suitable seed-apertures therein, by which the seed is delivered into the tubes X X, indicated by dotted lines in Fig. 4, which conduct it to the seed-teeth P Q. The vibrator H is pivoted between the brackets I I on the seed-box G, and is operated by the cam F on the wheel E, which works in the notch in its face, shown in Figs. 3 and 7. The up-turned end h of the vibrator H hooks up into a hole in the latch i, which is pivoted at k in a slot in the slide-plate J, and at the end of this latch is hung the pendent shipping-rod W, which extends down through an eye on the axle D, as shown in Figs. 3 and 7.

The length of the rod W is such as to prevent it from resting on the tooth-frame B when let down in working position, so that the latch i then hangs on the upturned end h of the vibrator; but when the tooth-frame or the end next the driving-wheel is raised to clear the teeth from the ground it raises the rod W and lifts the latch $i$ from the end $h$, thus unshipping the seeding mechanism. When the machine is turned to the right the driving-wheel E is the center of motion and does not revolve; hence there is no provision for unshipping the seeding mechanism by raising the end of the tooth-frame next the wheel E'.

The broadcast device $c\ d\ a$, shown in Fig. 6, consists of the base $d$ having the notches $e\ e$ cut at its lower corners, so as to leave a neck for the support of the valve-piece $a$, which is of the same general form as the section of the teeth P Q. The flap $c$ is formed on the base $d$ and covers the notches $e\ e$ in the rear, so as to cause the seed to drop down as it leaves the notches $e\ e$, instead of shooting back in the furrow, as it might otherwise do. This device is secured on the seed-teeth by a screw, $b$, as shown in Figs. 4 and 5, and when in this position the valve $a$ fits in the neck of the seed-tooth and thus forces the seed to drop down at the sides of the tooth through the notches $e\ e$, instead of dropping down through the center of the tooth, as it would otherwise do, thus depositing the seed at the sides instead of at the center of the furrows.

Having thus fully described my invention, what I claim as new, and desire to secure by Letters Patent, is—

1. The covering-tooth $o\ r\ s$, in combination with the seed-teeth P Q P, the working part $s\ t\ t\ u$ of said covering-tooth being of the general form shown, and being supported directly behind the seed-tooth Q and close up to the seed-teeth P P by a standard, $s\ r\ o$, running back nearly horizontal to a point, $r$, in the rear of the working part $s\ t\ t\ u$, and then rising to the tooth-frame B, substantially as and for the purpose specified.

2. The lifting-lever L provided with the forked end $n$, eye $p$, and pin-lever T, supporting-link M provided with the slot $m$ and locking-link N, in combination with the wheel-axle D and tooth-frame B, the several parts being arranged substantially as and for the purpose specified.

3. The slide-plate latch $i$, in combination with the vibrator H with upturned end $h$ and frame B, said parts being so arranged that the raising of the frame acts through the rod W to raise the latch from the upturned end $h$, substantially as and for the purpose specified.

4. The within-described broadcast device $a\ d\ c$, consisting of the base $d$ with notched passages $e\ e$, valve-pieces $a$, and guiding-flap $c$, when used in combination with the seed-teeth, substantially as and for the purpose specified.

As evidence of the foregoing I have hereunto set my hand in the presence of two witnesses this 10th day of February, A. D. 1871.

JOHN P. FLOOM.

Witnesses:
JOB ABBOTT,
ANDREW CHOFFIN. (84.)